United States Patent [19]

Schwarz

[11] 4,354,005

[45] Oct. 12, 1982

[54] METHOD FOR CONTROLLING ADDUCT FORMATION IN PRODUCTION OF ACRYLONITRILE-BUTADIENE-STYRENE-ACRYLATE COPOLYMERS

[75] Inventor: Richard Schwarz, Big Spring, Tex.

[73] Assignee: Cosden Technology, Inc., Dallas, Tex.

[21] Appl. No.: 310,196

[22] Filed: Oct. 9, 1981

[51] Int. Cl.³ .................... C08F 257/02; C08F 265/08
[52] U.S. Cl. .................................. 525/257; 525/244; 525/258; 525/264; 525/265; 525/313
[58] Field of Search ............... 525/244, 257, 258, 264, 525/265, 313

[56] References Cited

U.S. PATENT DOCUMENTS 4,247,668  1/1981  Bracke et al. ..................... 525/313

Primary Examiner—Carman J. Seccuro
Attorney, Agent, or Firm—M. Norwood Cheairs; J. D. Evans

[57] ABSTRACT

Formation of undesired by-product adduct during production of acrylonitrile-butadiene-styrene-acrylate copolymers is controlled by subjecting the inhibitor containing reaction mixture to a molecular-oxygen-containing gaseous atmosphere during addition of the acrylate monomer.

47 Claims, No Drawings

METHOD FOR CONTROLLING ADDUCT FORMATION IN PRODUCTION OF ACRYLONITRILE-BUTADIENE-STYRENE-ACRYLATE COPOLYMERS

BACKGROUND OF THE INVENTION

Acrylonitrile-Butadiene-Styrene-Acrylate copolymers (hereinafter referred to as ABSA copolymers) are styrenic resins comprising a rubbery acrylate-butadiene copolymer phase dispersed throughout a styrene-acrylonitrile resin matrix. Such polymers are known to have excellent impact strengths and improved light stabilities compared to conventional high impact polystyrene (HIPS). They can be produced by adding acrylate monomer and butadiene monomer to a suspension of styrene-acrylonitrile (SAN) polymer beads and polymerizing the resulting admixture.

Difficulties have been encountered, however, in producing ABSA copolymers due to undesired side reactions involving the acrylate monomer and/or the butadiene. The acrylate monomer polymerizes readily with itself to form acrylate homopolymers. Acrylate and butadiene can react with each other to form a cyclic ester often referred to as "adduct." Butadiene can also dimerize to form vinylcyclohexene. The presence of adduct in an ABSA copolymer adversely affects the properties of the copolymer. The polymerization reaction may be interfered with, leaving amounts of unreacted monomer. Polymer integrity and molecular weight may be reduced, impact strengths decreased, sticky polymer beads which tend to form agglomerates produced, and undesirable odor problems encountered.

In attempts to reduce the incidence of adduct formation, reversible chemical inhibitors have been added to the styrene acrylonitrile suspension prior to introduction of the reactive monomers. A deactivating agent for the reversible inhibitor is added to the suspension after the monomer addition has been completed to enable the desired polymerization to take place. For example, it has been attempted to inhibit adduct formation by adding sodium nitrite to the styrene-acrylonitrile suspension prior to introduction of the acrylate monomer and to thereafter deactivate the nitrite inhibitor with ammonium persulfate or sulfamic acid (see Bracke, et al., U.S. Pat. No. 4,247,668). Use of such systems has not proved entirely satisfactory for several reasons. Sophisticated analysis of the suspension is often necessary in order to assure that exactly the right amount of deactivating agent is added to the suspension, thereby precluding operation of the process by unskilled production personnel. Non-uniformities in the reaction rate occur as a result of localization of the effect of the inhibitor or the deactivating agent. Use of such agents can adversely affect the pH required to maintain the suspension and cause the styrene-acrylonitrile beads to precipitate. Production cycle lengths are unduly extended by the time required for analysis and addition of the chemical agents.

There is a need for an improved method for controlling adduct formation in the production of acrylonitrile-butadiene-styrene-acrylate copolymers.

SUMMARY OF THE INVENTION

Accordingly, it is an object of the present invention to provide a method for controlling adduct formation in production of acrylonitrile-butadiene-styrene-acrylate copolymers.

Another object of the present invention is to provide a method for controlling adduct formation in production of ABSA copolymers which does not require complex chemical analysis of the reactant suspension.

A further object of the present invention is to provide a method for controlling adduct formation in production of ABSA copolymers which results in production of uniform copolymers.

Yet another object of the present invention is to provide a method for controlling adduct formation in production of ABSA copolymers which does not involve the use of chemicals which may adversely affect the suspension.

A further object of the present invention is to provide a method for controlling adduct formation in production of ABSA copolymers which avoids the production of sticky beads.

It is also an object of the present invention to provide a method for production of acrylonitrile-butadiene-styrene-acrylate copolymers which reduces the incidence of odor problems.

An additional object of the present invention is to provide a method for production of ABSA copolymers having high impact strengths and good light stability.

Another object of the present invention is to provide a method for controlling adduct formation in production of ABSA copolymers which facilitates a comparatively short production cycle time.

It is also an object of the present invention to provide a method for controlling adduct formation in production of ABSA copolymers which reduces the cost of producing such copolymers.

These and other objects of the invention are achieved by providing a process for producing an acrylonitrile-butadiene-styrene-acrylate copolymer comprising the steps of providing an aqueous suspension of styrene-acrylonitrile copolymer; subjecting the suspension to a molecular-oxygen-containing gaseous atmosphere; adding polymerization inhibitor containing acrylate monomer to said copolymer suspension; replacing the molecular-oxygen-containing atmosphere with a sustantially molecular-oxygen-free atmosphere; adding a polymerization initiator and butadiene monomer to the acrylate monomer containing copolymer suspension; and reacting the acrylate monomer and butadiene containing copolymer suspension to produce an acrylonitrile-butadiene-styrene-acrylate copolymer.

In preferred aspects of the invention, the acrylate monomer contains up to 200 ppm of a quinone polymerization inhibitor; the suspension is subjected to a molecular-oxygen-containing gaseous atmosphere by pressurizing the reaction vessel containing the suspension with air; the molecular-oxygen-containing atmosphere is replaced with a molecular-oxygen-free atmosphere by venting the reaction vessel and then purging the reaction vessel with nitrogen; the polymerization initiator is a free radical polymerization initiator; and the polymerization initiator is added before the butadiene monomer.

DETAILED DESCRIPTION OF PREFERRED EMBODIMENTS

The styrene-acrylonitrile (SAN) polymer suspension utilized in the invention may be formed by in situ polymerization of styrene and acrylonitrile or by resuspension of styrene-acrylonitrile polymer beads. The SAN matrix may contain from 10 to 50 weight percent acrylonitrile and from 50 to 90 weight percent styrene. Preferably the SAN resin matrix will contain from about 25 to about 35 weight percent bound acrylonitrile and from about 65 to about 75 weight percent bound styrene. Generally the SAN polymer beads have a size between about 60 and about 100 screen mesh size. Typically the reaction vessel containing the suspension is provided with a stirrer so that the suspension may be subjected to continuous agitation.

Conventional suspending agents may be used in the suspension. Suitable agents include alcohol sulfate soaps such as those sold under the name "Sipex" by Alcolac, Inc. or linear alkyl sufonates such as those sold under the name "Nacconol" by Allied Chemical Corp. Other conventional ingredients of such suspensions such as anti-agglomeration agents and anti-foam agents (surfactants) may also be present. Suitable anti-agglomeration agents include tri-sodium phosphate, calcium chloride, and/or hydroxy apatite etc.

The pH of the suspension is preferably maintained between about 6 and about 8, most preferably from about 6.5 to about 7. Desirably, the pH may be monitored continuously or periodically throughout the reaction and adjusted as necessary by adding appropriate amounts of lime or the like.

The suspension is subjected to a molecular oxygen-containing gaseous atmosphere. The preferred molecular-oxygen-containing gas is air because of its ready availablity. This may be accomplished by sealing the reaction vessel and then pressurizing the reaction vessel with air. Pressures may range from about 0.5 to about 5 atmospheres (all pressures herein being gauge pressures). Preferably the reaction vessel will be pressurized with air to a pressure between about 1 and about 2 atmospheres.

Once the suspension has been subjected to the molecular-oxygen-containing gaseous atmosphere, addition of the acrylate monomer to the suspension may begin. A variety of acrylic monomers may suitably be utilized. Useful monomers include 2-ethylhexyl acrylate, butyl acrylate, methyl methacrylate and the like. Mixtures of acrylate monomers may also be utilized. Excluding post reactor bleading possiblities, the amount of acrylate monomer introduced into the suspension may range from about 20 to about 26 percent based on the weight of the ABSA polymer produced.

Commercially available acrylate monomers usually contain a minor amount of a quinone polymerization inhibitor in order to prevent polymerization of the monomer during shipment or storage. A typical inhibitor is the monomethyl ether of hydroquinone used in amounts from about 50 to about 200 ppm. The presence of such inhibitors may result in inhibitor concentrations of 20 to 50 ppm in the acrylate monomer containing styrene-acrylonitrile suspension, but this does not seem to appreciably interfere with the ultimate polymerization to produce the desired ABSA copolymer so long as oxygen is excluded from the polymerization reactor.

Desirably, the acrylate monomer is added gradually over a period of hours, preferably about 1 to about 8 hours, most preferably about 3 to about 5 hours. During the acrylate monomer addition, the suspension is maintained at elevated temperature. Desirably the temperature is maintained between about 100 and about 135 degrees C, preferably from about 110 to about 125 degrees C, during the acrylate addition. Following the addition of the acrylate monomer, the heating and stirring may optionally be continued for a while to allow the acrylate monomer to be completely absorbed by the styrene-acrylonitrile polymer beads. Good results have been obtained when the heating and stirring was continued for a period from about 1 to about 4 hours.

After the addition of the acrylate monomer is completed, the molecular-oxygen-containing gaseous atmosphere in the headspace of the reaction vessel is replaced with a substantially molecular-oxygen-free gaseous atmosphere. This is achieved by venting the headspace of the vessel to allow air to escape until the pressure in the vessel is reduced to ambient pressure or near ambient pressure. Prior to the venting operation, the reaction mixture should be cooled to about 100 degrees C. or less to prevent all of the water from escaping as steam when the vessel is vented. Even when cooled to this level, some of the water from the reaction mixture will be vaporized and vented in the form of steam. This steam helps to sweep the molecular-oxygen-containing gas from the headspace of the vessel.

The headspace of the vessel is then purged. It is preferred to use nitrogen gas for this purpose, although other substantially inert gases could also be used. The desired purging may be effected by pressurizing the reaction vessel with nitrogen gas to a pressure between about 1.5 and about 3 atmospheres and then venting the vessel to the ambient atmosphere until the gauge pressure is reduced to about 0.3 to about 0.5 atmospheres. Three repetitions of the nitrogen pressurization and venting have been found to purge substantially all of the molecular-oxygen-containing gas from the headspace of the vessel. A substantially molecular-oxygen-free gaseous atmosphere is thus established in the vessel.

A polymerization initiator is then added to the suspension in the vessel. Preferred initiators are free radical polymerization catalysts such as tertiary butyl perbenzoate and dicumyl peroxide. Tertiary butyl perbenzoate is particularly preferred. If desired, the suspension may be left for a period of from 0.1 to 2 hours, preferably 0.2 to 1 hour after the addition of the catalyst to assure that the catalyst is uniformly dispersed throughout the reaction mixture. It is also possible to add the catalyst simultaneously with the butadiene monomer.

Butadiene monomer is also added to the acrylate monomer containing suspension. Preferably, the butadiene monomer is added gradually over a period of from about 1 to about 16 hours. The amount of butadiene added may vary up to about 9 weight percent of the ABSA copolymer produced.

It has been found advantageous to add the butadiene monomer in two stages. In the first stage, from about one-fourth to about one-half of the butadiene is added over a period from about 1 to about 2 hours while the suspension is maintained at a temperature of 100 degrees C. or less, preferably 90 to 95 degrees C. This enables butadiene to become substantially dispersed throughout the reaction system before the bulk of the polymerization reaction takes place. In the second stage addition, the rest of the butadiene is added more gradually over a period from about 4 to about 12 hours at a temperature between about 100 degrees C. and about 105 degrees C. This addition procedure facilitates uniform dispersion of the butadiene throughout the styrenic copolymer matrix.

The acrylate and butadiene containing suspension is then heated for a period of from 1 to 12 hours at a temperature between about 120 and about 150 degrees C. It has been found advantageous to increase the reaction temperature by stages as the reaction proceeds. Using lower initial reaction temperature prevents the polymerization from occuring too rapidly at the outset, and also assists in reducing the occurrence of Diels-Alder reactions which produce adduct. Higher reaction temperature at the end of the reaction help to drive the polymerization reaction to completion.

Throughout the entire process, the pH of the suspension should be monitored periodically or continuously and adjusted as necessary by adding lime or other suitable ingredients in order to maintain a pH from about 6 to about 8, preferably from about 6.5 to about 7.

Pressures achieved within the reaction vessel depend on the temperature at which the reaction is carried out. During the course of the polymerization, pressures may reach as high as 7 atmospheres or more. The pressure should be carefully monitored and the temperature reduced if the pressure starts to exceed the maximum safe limit of the reaction vessel. Ordinarily, it is not necessary to carry out the reaction at temperatures at which the gauge pressure will exceed about 5 atmospheres.

When the reaction is completed, the reaction vessel is cooled and vented and the resulting ABSA copolymer beads are recovered. Typically the work-up precedure involves separating the polymer beads from the suspension, acidifying the beads, washing the beads with water and then drying the copolymer beads.

Molded articles made from ABSA copolymers produced according to the foregoing procedure have excellent impact strengths and exhibit good light stability. The adduct content of such polymers is generally less than about 2 percent and often amounts to only about 1 percent. The content of residual unpolymerized acrylate monomer should be less than 0.05 weight percent. It is believed that vinyl cyclohexene contents should be less than about 200 ppm.

Further details of the invention will appear from a consideration of the following examples.

EXAMPLE 1

Beads of a styrene-acrylonitrile copolymer weighing a total of 103.1 kilograms and having a bead size between 60 and 100 screen mesh size were dispersed in 173 liters of water containing 614 grams tri-sodium phosphate, 855 grams calcium chloride and 383 grams "Sipex" soap in a continuously stirred reactor. The styrene-acrylonitrile copolymer comprised 30 weight percent acrylonitrile and 70 weight percent styrene and had an ASTM melt flow index of 4.5 grams per 10 minutes at 230 degrees C. Forty-nine grams of lime (calcium hydroxide) were added to adjust the pH to between 6.5 and 7.0. The reaction vessel was then sealed and pressurized with air to a pressure of 1.7 atmospheres. Heating was increased until the temperature was raised to 120 degrees C. at which time 132 grams of a surfactant anti-foam agent (sold by the Rohm and Haas Company under the name "Triton X-100") were added to the suspension. Thirty and nine-tenths kilograms of 2-ethylhexyl acrylate were then added to the suspension over a period of about 4 hours while the temperature was maintained at 120 degrees C. After the addition of the acrylate was completed, the suspension was cooled to about 95 degrees C., and the vessel was vented to the atmosphere to release the pressurized air. The remaining air was purged from the reaction vessel by three times pressurizing the vessel with nitrogen to a gauge pressure of 2.2 atmospheres and then venting the vessel until the gauge pressure dropped to substantially 0 (less than about 0.5 atmospheres). One hundred seventy-seven grams tertiary butyl perbenzoate free radical initiator were then injected into the suspension, and the addition of butadiene monomer to the suspension awas commenced. Three and three-tenths kilograms butadiene were added over a period of one hour while the temperature was maintained at about 95 degrees C. Thereafter the temperature was raised to about 102 degrees C., and 9.9 kilograms butadiene were added over a period of about 8 hours. Following addition of all of the butadiene, the temperature was maintained at 100 degrees C. for an additional 2 hours. The temperature was then raised to 130 degrees C. for 2 hours and finally increased to 135 degrees C. for an additional 2 hours. The gauge pressure in the reaction vessel was continually monitored and was prevented from exceeding about 6 atmospheres by venting as necessary and adjusting the temperature. At the end of the heating, the vessel was vented until the pressure stabilized between 2½ and 3 atmospheres, held for one hour, cooled, and processed by separating the ABSA copolymer beads from the suspension, acidifying them with hydrochloric acid, washing them with water and then drying the beads. The product had a cyclic ester content of only 1.5 percent and exhibited good properties for use in forming molded articles.

EXAMPLE 2

The procedure of Example 1 was repeated except the reaction vessel was pressurized with nitrogen instead of air during the addition of the acrylate monomer. The resulting ABSA copolymer had an adduct content of 4.8 percent. Beads of the polymer were sticky and extremely hard to handle and were unsatifactory for producing molded articles.

In repeated tests, the adduct content of the ABSA copolymer was never more than 2.1 percent when the suspension was properly subjected to a molecular-oxygen-containing atmosphere during the addition of the acrylate monomer. In distinct contrast thereto, the adduct content was never less than 3.5 percent when the suspension was subjected to a molecular-oxygen-free nitrogen atmosphere during the acrylate addition.

The foregoing preferred embodiments have been described merely for the purpose of providing a representative illustration of the invention and are not intended to be limiting. Since modifications of the disclosed embodiments incorporating the spirit and substance of the invention may occur to persons skilled in the art, the scope of the invention is to be limited solely by the scope of the appended claims.

I claim:

1. A process for producing an acrylonitrile-butadiene-styrene-acrylate copolymer comprising the steps of:
   providing an aqueous suspension of styrene-acrylonitrile copolymer;
   subjecting said suspension to a molecular-oxygen-containing gaseous atmosphere;
   adding polymerization inhibitor containing acrylate monomer to said copolymer suspension;
   replacing said molecular-oxygen-containing gaseous atmosphere with a substantially molecular-oxygen-free gaseous atmosphere;
   adding a polymerization initator to the acrylate monomer containing copolymer suspension;
   adding butadiene monomer to the arcylate monomer containing copolymer suspension; and reacting the acrylate monomer and butadiene containing copolymer suspension to produce an acrylonitrile-butadiene-styrene-acrylate copolymer.

2. A process according to claim 1 wherein said acrylate monomer contains up to 200 ppm of a quinone polymerization inhibitor.

3. A process according to claim 2 wherein said quinone inhibitor is the monomethyl ether of hydroquinone.

4. A process according to claim 1 further comprising the step of recovering the acrylonitrile-butadiene-styrene-acrylate copolymer.

5. A process according to claim 1 wherein said suspension is provided by in situ polymerization of styrene and acrylonitrile.

6. A process according to claim 1 wherein said suspension is provided by resuspension of styrene-acrylonitrile copolymer beads.

7. A process according to claim 6 wherein said copolymer beads have a particle size between about 60 and about 100 mesh size.

8. A process according to claim 1 wherein said suspension further comprises at least one suspending agent.

9. A process according to claim 1 wherein said suspension further comprises at least one anti-agglomeration agent.

10. A process according to claim 1 wherein an antifoam agent is added to said suspension.

11. A process according to claim 1 wherein the pH of said suspension is maintained from about 6 to about 8.

12. A process according to claim 11 wherein the pH of said suspension is maintained from about 6.5 to about 7.

13. A process according to claim 1 wherein said suspension is subjected to continuous agitation.

14. A process according to claim 1 wherein said molecular-oxygen-containing gas is air.

15. A process according to claim 14 wherein said suspension is provided in a gas-tight, sealed reaction vessel and said vessel is pressurized with air.

16. A process according to claim 15 wherein said vessel is pressurized with air to a gauge pressure from about 0.5 to about 5 atmospheres.

17. A process according to claim 16 wherein said vessel is pressurized with air to gauge pressure from about 1 to about 2 atmospheres.

18. A process according to claim 1 wherein said acrylate monomer is selected from the group consisting of 2-ethylhexyl acrylate, and methyl methacrylate.

19. A process according to claim 18 wherein said acrylate monomer is 2-ethylhexyl acrylate.

20. A process according to claim 1 wherein said acrylate monomer is added gradually over a period of from about 1 to about 8 hours.

21. A process according to claim 1 wherein said suspension is maintained at elevated temperature during the addition of the acrylate monomer.

22. A process according to claim 21 wherein said suspension is maintained at a temperature from about 100 to about 135 degrees C. during the addition of the acrylate monomer.

23. A process according to claim 22 wherein said suspension is maintained at a temperature from about 110 to about 125 degrees C. during the addition of the acrylate monomer.

24. A process according to claim 21 wherein the application of heat is continued with stirring for a period from about 1 to about 4 hours after the addition of the acrylate monomer to facilitate absorption of the acrylate monomer into the styrene-acrylonitrile matrix.

25. A process according to claim 1 wherein said molecular-oxygen-containing atmosphere is replaced with a substantially molecular-oxygen-free atmosphere by purging a gas-tight, sealed vessel in which the suspension is maintained with nitrogen gas.

26. A process according to claim 25 wherein said purging is effected by repeatedly pressurizing said vessel with nitrogen gas and then venting the vessel to release the pressurized nitrogen gas to the ambient atmosphere.

27. A process according to claim 26 wherein said vessel is pressurized and vented three times.

28. A process according to claim 1 wherein said suspension is left for a period from about 0.2 to about 1 hour after the addition of said polymerization initiator to facilitate dispersion of the initator throughout the suspension.

29. A process according to claim 1 wherein said polymerization initator is a free radical catalyst.

30. A process according to claim 29 wherein said catalyst is tertiary butyl perbenzoate.

31. A process according to claim 1 wherein butadiene monomer is added simutaneously with said polymerization initator.

32. A process according to claim 1 wherein butadiene monomer is added gradually over a period from about 1 to about 16 hours.

33. A process according to claim 1 wherein from about one-fourth to about one-half of the total butadiene is added over a period from about 0.5 to about 2 hours at a temperature of about 95 degrees C. and the remainder of the butadiene is added more gradually over a period of from about 4 to about 12 hours at a temperature of about 100 degrees C.

34. A process according to claim 1 wherein the acrylate monomer and butadiene containing copolymer suspension is reacted by heating said suspension to a temperature from about 120 to about 150 degrees C. for a period from about 1 to about 12 hours.

35. A process according to claim 1 wherein the copolymer suspension containing acrylate monomer and butadiene is first heated at a temperature of about 100 degrees C. for a period of about 2 hours and then heated at a temperature of about 130 degrees C. for a period of about 2 hours and thereafter heated at a temperature of about 135 degrees C. for a period of about 2 hours.

36. A process according to claim 1 wherein the pH of the suspension is monitored at least periodically throughout said process and adjusted as necessary to maintain the pH within a desired range.

37. A process according to claim 36 wherein the pH is adjusted by adding sufficient lime to maintain the pH from about 6.5 to about 7.

38. A process according to claim 1 wherein the suspension is maintained in a pressurized vessel during the reaction and the pressure is not permitted to exceed 7 atmospheres gauge.

39. A process according to claim 38 wherein the gauge pressure in said pressurized vessel is not permitted to exceed 6 atmospheres.

40. A process according to claim 4 wherein said acrylate monomer contains at least 50 ppm monomethyl ether of hydroquinone.

41. A process according to claim 1 wherein the adduct content of said acrylonitrile-butadiene-styrene-acrylate copolymer is less than about 2 weight percent.

42. A process according to claim 41 wherein the adduct content of the acrylonitrile-butadiene-styrene-acrylate copolymer is about 1 weight percent.

43. A process according to claim 1 wherein the reaction is carried out until the residual acrylate monomer content of the acrylonitrile-butadiene-styrene-acrylate copolymer is less than about 0.05 weight percent.

44. A process according to claim 1 wherein the suspension is cooled to a temperature less than about 100 degrees C. before venting the reaction vessel to release the pressurized air.

45. A process according to claim 1 wherein the acrylonitrile-butadiene-styrene-acrylate copolymer comprises less than 200 ppm vinyl cyclohexene.

46. A process according to claim 1 wherein the styrene-acrylonitrile copolymer beads in the suspension comprise from about 70 to about 65 percent, the acrylate monomer added to the suspension comprises from about 20 to about 26 percent and the butadiene added to the suspension comprises up to about 9 percent of the weight of the resulting acrylonitrile-butadiene-styrene-acrylate copolymer.

47. A process according to claim 1 wherein said styrene-acrylonitrile copolymer comprises from about 25 to about 35 weight percent bound acrylonitrile and about 65 to about 75 weight percent bound styrene.

* * * * *